Nov. 28, 1950

E. A. LINK 2,531,521

AIR-SPEED INDICATING SYSTEM FOR
ROTARY WINGED AIRCRAFT

Filed Oct. 16, 1943

EDWIN A. LINK.
*INVENTOR.*

BY

ATTORNEYS.

Nov. 28, 1950 E. A. LINK 2,531,521
AIR-SPEED INDICATING SYSTEM FOR
ROTARY WINGED AIRCRAFT
Filed Oct. 16, 1943 2 Sheets-Sheet 2

EDWIN A. LINK
*INVENTOR.*

BY

ATTORNEYS.

Patented Nov. 28, 1950

2,531,521

UNITED STATES PATENT OFFICE 2,531,521

AIR-SPEED INDICATING SYSTEM FOR ROTARY WINGED AIRCRAFT

Edwin A. Link, Binghamton, N. Y.

Application October 16, 1943, Serial No. 506,461

2 Claims. (Cl. 73—182)

My invention relates to an air speed indicator for rotary winged aircraft.

One of the basic instruments used in the navigation of aircraft is the air speed indicator which indicates the forward speed of the craft through the mass of air in which it is flying. Such an indicator comprises a Pitot tube and a static tube, the former being responsive to the impact pressure of the air caused by the travel of the plane through the air while the latter is responsive to the static pressure of the air surrounding it. These two pressures are introduced into the air speed indicator which comprises well known mechanism for indicating, according to the relative values of the pressures, the air speed of the vehicle in question. However, an air speed indicator will function satisfactorily only in case the Pitot and static tubes are placed at a point upon the craft where the air is undisturbed by either the forward travel of the vehicle or by the action of its propeller. For this reason the tubes, in the case of an airplane, are usually placed on the leading edge of one of its wings at a point transversely removed from the propeller or propellers, or in the event the nose of the plane is substantially ahead of the propellers the tubes are often placed at that point.

As is well known, rotary-winged aircraft known as helicopters, comprise a generally vertical rotor having its lower end held within a fuselage to which no fixed wings are attached. Attached to the upper end of the rotor are a plurality of wings which rotate with the rotor and it is the interaction of these blades upon the air surrounding them which causes the helicopter to travel vertically, forward, backward and sideways. The action of the blades upon the air results in the movement downward therefrom of a turbulent column of air which practically completely engulfs the whole fuselage and attached parts, and therefore, experts in the field have been unable to locate any point upon the helicopter at which the Pitot and static tubes may be placed to give satisfactory air speed indications.

It is therefore the principal object of my invention to provide means by which the air speed of a rotary winged aircraft or helicopter may be satisfactorily determined.

It is a related object of my invention to provide means by which the usual Pitot and static tubes may be combined with a modified conventional air speed indicator to indicate the air speed of such an aircraft.

It is a further object of my invention to provide means by which the Pitot and static pressures at the end of the rotary wings may be measured when the end of the wing is moving substantially parallel to the line of flight, to position an element in accordance with these pressures, and then to combine with the positioning of this element a factor representative of the speed through the air of the Pitot and static tubes caused by the rotation of the wings, whereby the final indicated result is that of the speed through the air of the Pitot and static tubes caused by the travel of the aircraft through the air.

In order that my invention may be more readily understood reference is made to the accompanying drawings in which a preferred embodiment of my invention is shown in combination with a helicopter. In the drawings, Fig. 1 is a general view of a helicopter showing the fuselage, main and auxiliary rotors, and the Pitot and static tubes positioned at the end of one of the wings attached to the main rotor.

Figure 1:
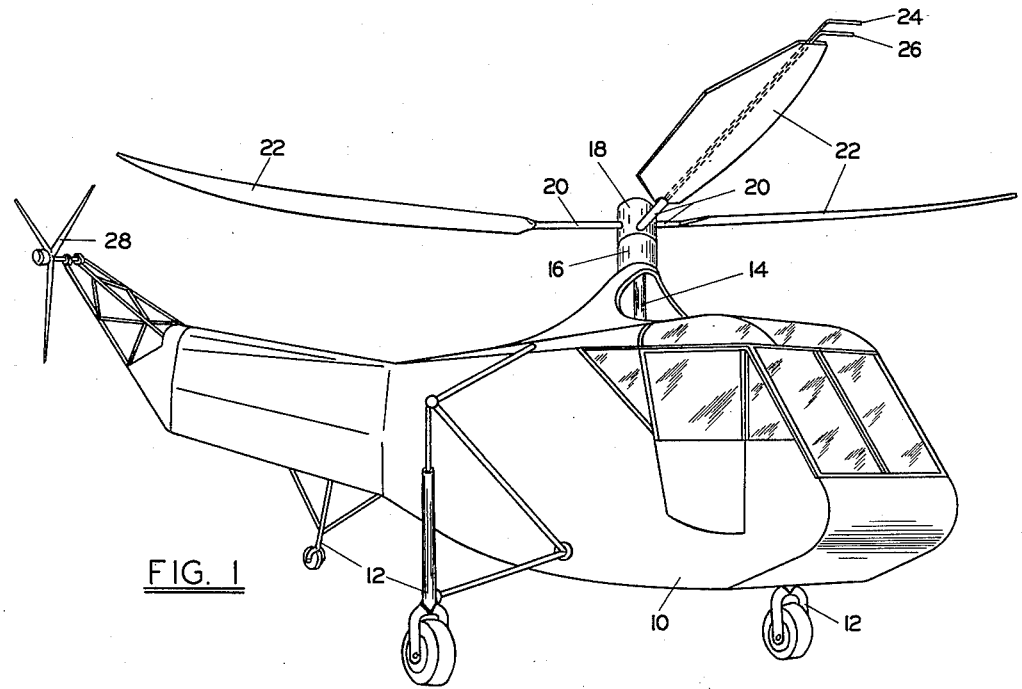

Reference is now made to Fig. 1 which shows the general view of a helicopter and in which the number 10 designates the fuselage to which suitable landing gear 12 is attached. The main rotor 14 has its lower end (not shown) suitably mounted in the fuselage, while surrounding this rotor is member 16 which will later be described in detail. Hub 18 is fixedly attached to the upper end of rotor 14 and fixed thereto for rotation therewith are a plurality of shafts 20, each of which carries a wing 22. Mounted upon the end of one or more of the wings 22 is a Pitot tube 24 and a static tube 26. I so position the Pitot and static tubes because at that point the atmosphere is relatively undisturbed by the movement of the wings. Suitably mounted upon the rear end of the fuselage 10 is the auxiliary rotor 28 which is used to steer the vehicle in a well-known manner.

Figure 2:
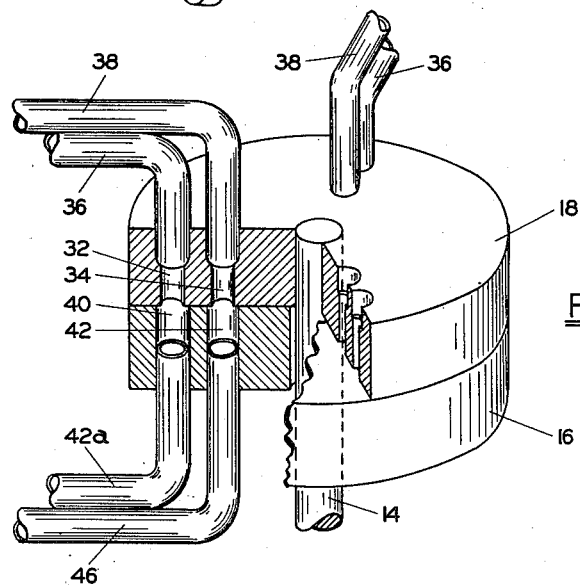
Fig. 2 shows the hub of the rotor modified in accordance with my invention.

Reference is now made to Fig. 2 showing hub 18 which is rigidly affixed to rotor 14 and member 16 which surrounds rotor 14 but does not turn therewith. A plurality of bores 32 and 34 are placed in hub 18, and each of the tubes 36 connects with one of the bores 32 while a similar tube 38 connects with each of the bores 34. These tubes are preferably within the shafts 20 which support wings 22, and the other end of each of the tubes 36 connects with a Pitot tube 24 mounted upon the end of one of the wings 22 while the other end of each of the tubes 38 connects with a static tube 26 also mounted upon the end of one of the wings 22. It should be noticed that for each wing 22 that has a Pitot and static tube mounted thereupon there are a pair of tubes 36 and 38 and a pair of bores 32 and 34.

Figure 3:
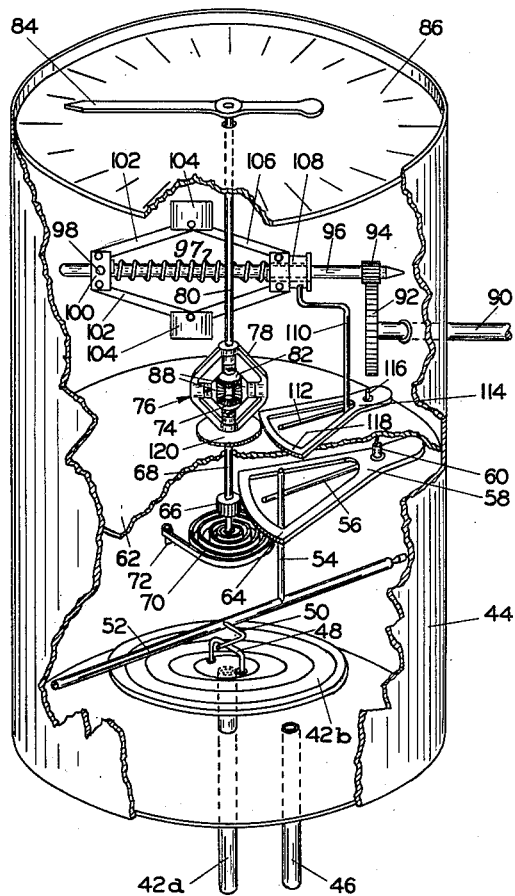
Fig. 3 is a view of an air speed indicator modified to meet the purposes of my invention.

In member 16 is a pair of bores 40 and 42 and in communication with the bore 40 is a tube 42a, the other end of which terminates inside diaphragm 42b, which, as shown in Fig. 3, is within airtight casing 44 which houses the mechanism of my modified air speed indicator. Similarly, in communication with the bore 42 is a tube 46, the other end of each of which terminates inside casing 44 outside diaphragm 42b.

Bores 40 and bores 42 are positioned within fixed member 16 so that they are in communication with each pair of bores 32 and 34 only when the Pitot and static tubes 24 and 26 connected to the tubes 36 and 38 are traveling in a path substantially parallel to the line of flight of the helicopter and, therefore, intermittently, a pressure proportional to the speed through the air of the ends of the wings 22 is introduced inside diaphragm 42b while the static pressure existent at the same instant is introduced inside casing 44 and outside diaphragm 42b. Inasmuch as the Pitot pressure exceeds the static pressure by an amount proportional to the rate of travel of the Pitot and static tubes 24 and 26 at the instant when bores 32 and 34 are in communication with the bores 40 and 42, diaphragm 42b will expand proportionately, raising bracket 48 which is rigidly mounted upon the upper movable surface of the diaphragm. Arm 50 will have its end resting upon bracket 48 raised and inasmuch as its other end is fixedly attached to rocker arm 52 which has each of its ends pivotally mounted within casing 44, rocker arm 52 will be rotated counterclockwise as seen from the left side in Fig. 3. Vertical shaft 54 which has its lower end affixed to rocker shaft 52 will therefore move toward the rear of the instrument as seen in Fig. 3, carrying before its upper end the arm 56 against which it bears. Arm 56 has its rightmost end affixed to yoke 58 which is pivotally mounted by means of pin 60 to airtight sealing disc 62 within casing 44. The resulting movement of arm 56, it will be understood, will carry yoke 58 with it, and the gear sector 64 formed integrally with this yoke will move therewith.

Sector 64 is in mesh with pinion 66 fixedly mounted upon vertical shaft 68 to the lower end of which the inside end of anti-back lash torsion spring 70 is attached. The outer end of this spring is anchored to bracket 72 which is attached to the inside of casing 44. The lower end of vertical shaft 68 is held by a bracket (not shown) also attached to the inside of casing 44.

Vertical shaft 68 passes through disc 62 by means of an airtight fitting and is directly connected to bevel gear 74 which is the primary drive of differential designated generally by 76. This differential comprises three other bevel gears combined within yoke 78 in a well-known manner. Another vertical shaft 80 is affixed to the uppermost of these bevel gears 82 for rotation therewith, and attached to the upper end of this shaft is pointer 84 which moves over dial 86 which is calibrated, preferably, in miles per hour.

From the foregoing it will be realized that the expansion of diaphragm 42b which moves gear sector 64 toward the rear of the instrument casing 44 as seen in Fig. 3 will cause a counterclockwise rotation of pinion 66, as seen from above, and a similar rotation of vertical shaft 68 and bevel gear 74 will occur. Bevel gears 88 will rotate in such a direction to cause bevel gear 82 to rotate clockwise, as seen from above, and vertical shaft 80 will turn in the same direction, carrying with it pointer 84 over scale 86. Inasmuch as the expansion of diaphragm 42b is proportional to the rate of travel of the Pitot and static tubes 24 and 26 through the surrounding air, which rate of travel is the forward speed of the craft through the air plus the rotary speed of the wings 22, it will be understood that in the absence of any modifying mechanism pointer 84 and dial 86 will indicate the air speed of the helicopter plus the rate of travel of the ends of the wings through the air. Means will now be described whereby the factor of rotary rate of travel of the ends of the wings 22 through the air may be subtracted from this sum of forward speed of the helicopter through the air plus rotary speed of the ends of the wings, whereupon pointer 84 and dial 86 will indicate the forward speed of travel through the air of the craft.

Seen in Fig. 3 is a shaft 90 which is connected to rotor 14 in a manner that its speed of rotation will be proportional to the speed of rotation of this rotor. This shaft has one end which projects inside casing 44 above disc 62 and fixedly mounted upon its interior end is spur gear 92 which is in mesh with pinion 94 formed integrally with horizontal shaft 96 rotatably mounted within casing 44. Fixedly attached to the left end of shaft 96 by means of pin 98 is collar 100 which in turn has two arms 102 pivotally attached thereto as shown, the other end of each of these arms being likewise attached to a weight 104. Another pair of arms 106 have their left ends pivotally attached to weights 104 while their other ends are similarly attached to collar 108 which is slidably mounted upon shaft 96. Compression spring 97 surrounds shaft 96 and bears against collars 100 and 108. Fixedly attached to collar 108 is depending arm 110 whose lower end engages arm 112 fixed to yoke 114 which is pivotally mounted upon disc 62 by means of pin 116. Formed integrally with yoke 114 is sector gear 118 which is in mesh with spur gear 120 which is affixed to yoke 78 of differential 76, thus forming a secondary drive for this differential. It will be realized that a rotation of gear 120 will turn yoke 78, and inasmuch as bevel gear 74 is prevented from turning by gear 66 and sector 64, bevel gears 88 are rotated causing a rotation of bevel gear 82 and vertical shaft 80, and pointer 84 moves over dial 86. The faster the rotation of shaft 90, which rotation it will be recalled is proportional to the speed of rotor 14, the greater will be the speed of rotation of shaft 96. Weights 104 will therefore be thrown a greater distance from shaft 96, and collar 108 will be moved to the left in Fig. 3 against the action of spring 97 carrying with it arm 110, the lower end of which will move arm 112 and yoke 114 to which it is attached clockwise as seen from above. Gear sector 118 will therefore move in the same direction and spur gear 120 will be moved counterclockwise as seen from above, thereby turning yoke 78 of differential 76 in the same direction. Bevel gear 74 remains stationary, but bevel gears 88 are turned in such a direction to rotate bevel gear 82 counterclockwise as seen from above. Vertical shaft 80 is turned in the same direction, and pointer 84 moves counterclockwise over dial 86. Inasmuch as dial 86 is graduated to indicate a higher airspeed as pointer 84 moves clockwise over dial 86, the counterclockwise rotation of pointer 84 caused by an increase in the rate of rotation of rotor 14 will be subtracted from the primary clockwise rotation of pointer 84 caused by an increase in the rate of rotation of rotor 14.

From the foregoing it should be understood that my airspeed indicator for rotary winged aircraft comprises, generally, means for measuring the Pitot and static pressures at a point along one or more of the rotating wings when the wing is traveling along a path substantially parallel to the line of flight, positioning an element in accordance with the said pressures, and then modifying the position of said element in accordance with the rotary speed of the blade, whereupon the final position of said element is indicative of the air speed of the craft.

I claim:

1. An airspeed indicating system for a rotary winged aircraft comprising dynamic and static pressure intakes on a wing of the aircraft, a valve connected to the intakes and dynamic-static pressure responsive means connected to the valve, means to actuate said valve in synchronism with the rotation of the wing to connect said intakes to said dynamic-static pressure responsive means only when said wing is in a selected position about its vertical axis of rotation, a movable element positioned by said dynamic-static pressure responsive means, means responsive to the speed of rotation of said wing for modifying the position of said movable element according to the speed of rotation of said wing, and an airspeed indicator operated by said movable element.

2. The apparatus of claim 1 in which the dynamic-static pressure responsive means comprises a diaphragm in a static pressure chamber.

EDWIN A. LINK.

REFERENCES CITED

The following references are of record in the file of this patent:

UNITED STATES PATENTS

| Number | Name | Date |
|---|---|---|
| 652,666 | Darlington | June 26, 1900 |
| 1,146,202 | Ogilvie | July 13, 1915 |
| 1,525,963 | Sperry | Feb. 10, 1925 |
| 2,209,879 | Focke | July 30, 1940 |
| 2,210,388 | Vail | Aug. 6, 1940 |

FOREIGN PATENTS

| Number | Country | Date |
|---|---|---|
| 372,204 | Great Britain | May 5, 1932 |